United States Patent
Munche et al.

(10) Patent No.: US 6,843,762 B2
(45) Date of Patent: Jan. 18, 2005

(54) SPREADER ROLL (75) Inventors: Denis L. Munche, Neenah, WI (US); David P. Boutin, Brunswick, ME (US)

(73) Assignee: Spencer Johnston Company, Neenah, WI (US)

( * ) Notice: Subject to any disclaimer, the term of this patent is extended or adjusted under 35 U.S.C. 154(b) by 0 days.

(21) Appl. No.: 09/740,262

(22) Filed: Dec. 18, 2000

(65) Prior Publication Data

US 2002/0077235 A1 Jun. 20, 2002

(51) Int. Cl.$^7$ .............................................. F16C 13/00
(52) U.S. Cl. .......................... 492/40; 492/20; 492/38; 492/45
(58) Field of Search .............................. 492/40, 30, 28, 492/38, 45

(56) References Cited

U.S. PATENT DOCUMENTS

| | | | |
|---|---|---|---|
| 679,821 A | * | 8/1901 | Arnold |
| 1,040,993 A | | 10/1912 | Bakke |
| 1,266,061 A | | 5/1918 | Scoville |
| 1,515,266 A | | 11/1924 | Mitchell |
| 1,516,083 A | * | 11/1924 | Curtis |
| 1,734,244 A | | 11/1929 | Bingman |
| 1,776,382 A | | 9/1930 | Farrell |
| 1,927,849 A | * | 9/1933 | Roberts |
| 2,393,191 A | | 1/1946 | Robertson |
| 2,689,392 A | | 9/1954 | Robertson |
| 2,712,205 A | * | 7/1955 | Valette |
| 2,948,384 A | * | 8/1960 | Pate |
| 2,952,889 A | | 9/1960 | Hanssen |
| 2,952,898 A | | 9/1960 | Glavan et al. |
| 3,094,771 A | | 6/1963 | Robertson |
| 3,263,517 A | * | 8/1966 | Cosmos |
| 3,308,519 A | * | 3/1967 | Westgate |
| 3,386,149 A | | 6/1968 | Robertson |
| 3,463,377 A | | 8/1969 | Lucas |
| 3,478,555 A | | 11/1969 | Achler et al. |
| 3,645,433 A | | 2/1972 | Lucas et al. |
| 3,760,477 A | * | 9/1973 | Koch |
| 3,763,992 A | * | 10/1973 | Klenk |
| 3,765,616 A | | 10/1973 | Hutzenlaub et al. |
| 3,786,975 A | | 1/1974 | Heymanns |
| 3,796,423 A | * | 3/1974 | Shuster |
| 3,808,846 A | | 5/1974 | Fleissner |
| 3,848,304 A | | 11/1974 | Lucas |
| 3,878,883 A | | 4/1975 | Hazelett et al. |
| 3,889,334 A | | 6/1975 | Justus et al. |
| 3,918,774 A | * | 11/1975 | Nicholson |
| 3,964,658 A | * | 6/1976 | Edwards |
| 3,969,801 A | | 7/1976 | Dolene et al. |
| 3,980,289 A | | 9/1976 | Harm |
| 4,006,704 A | | 2/1977 | Perondi |
| 4,029,264 A | | 6/1977 | Reese |
| 4,033,497 A | * | 7/1977 | Przygocki |

(List continued on next page.)

FOREIGN PATENT DOCUMENTS

| | | | |
|---|---|---|---|
| CA | 2177797 | | 5/1996 |
| JP | 3-210997 | * | 9/1991 |

*Primary Examiner*—Charles T. Jordan
*Assistant Examiner*—T. Nguyen
(74) *Attorney, Agent, or Firm*—Ryan Kromholz & Manion, S.C.

(57) ABSTRACT

A spreader roll that is useful to spread a slit web into a plurality of split webs for rewinding or at numerous other critical processes positions on web machines and related finishing and converting equipment. The spreader roll includes a bowable shaft and a plurality of interconnected cylinder elements mounted for rotation about the shaft. The cylinder elements each include a cylindrical outer surface and opposite end portions having nonlinear profiles to thereby provide intermittent support of the split webs as they pass over the spreader roll.

14 Claims, 5 Drawing Sheets

U.S. PATENT DOCUMENTS

| | | |
|---|---|---|
| 4,146,946 A | 4/1979 | Plaia et al. |
| 4,194,275 A | 3/1980 | Freuler |
| 4,201,466 A | 5/1980 | Seelenbinder |
| 4,293,988 A | 10/1981 | Biondetti |
| 4,352,838 A | 10/1982 | Bostroem |
| 4,410,122 A | 10/1983 | Frye et al. |
| 4,422,403 A | 12/1983 | Bostroem |
| 4,455,727 A | 6/1984 | Tschirner |
| 4,552,201 A | 11/1985 | Wood |
| 4,566,154 A | 1/1986 | Streeper et al. |
| 4,669,646 A | 6/1987 | Oinonen |
| 4,691,908 A | 9/1987 | Bradley |
| 4,751,776 A | 6/1988 | Reunamaki |
| 4,793,250 A | 12/1988 | Niskanen |
| 4,795,510 A | 1/1989 | Wittrock et al. |
| 4,803,877 A | 2/1989 | Yano |
| 4,909,905 A | 3/1990 | Ilmarinen et al. |
| 4,913,051 A | 4/1990 | Molinatto |
| 4,921,037 A | 5/1990 | Bergeron et al. |
| 4,962,577 A | 10/1990 | Kubik et al. |
| 5,084,139 A | 1/1992 | Autio |
| 5,174,002 A | 12/1992 | Kusters |
| 5,273,197 A | 12/1993 | Wenk |
| 5,421,259 A | 6/1995 | Shiba et al. |
| 5,461,760 A | 10/1995 | Damour |
| 5,477,912 A | 12/1995 | Cisko et al. |
| 5,483,811 A | 1/1996 | Miller |
| 5,484,370 A | 1/1996 | Jenke et al. |
| 5,495,798 A | 3/1996 | Niskanen et al. |
| 5,702,524 A | 12/1997 | Finnicum et al. |
| 5,735,783 A | 4/1998 | Joensuu |
| 5,746,128 A | 5/1998 | Reichwein |
| 5,832,626 A | 11/1998 | Buttschardt |
| 5,904,812 A | 5/1999 | Salman et al. |
| 6,042,525 A | 3/2000 | Rajaniemi |
| 6,077,390 A | 6/2000 | Salman et al. |
| 6,082,660 A | 7/2000 | Meyer |
| 6,092,761 A | 7/2000 | Muchaben |
| 6,129,305 A | 10/2000 | Moller et al. |
| 6,152,604 A | 11/2000 | Ostling et al. |

* cited by examiner

SPREADER ROLL

BACKGROUND OF THE INVENTION

This invention relates to spreader rolls, in particular to a new and improved device of this type which overcomes the difficulties experienced using the usual devices.

Spreader rolls are used on machines for the manufacture of paper, plastic or other web-like material, and typically include a bowed or adjustably bowable, non-rotatable shaft and an a outer roll surface mounted for rotation on the shaft. Generally, the outer roll surface is composed of a plurality of individual, longitudinally aligned, interconnected cylinder elements. These are often referenced to as roll segments.

In the production of web-like material, such as paper, a machine produces the web product on large rolls, which are cumbersome to handle and hence must be cut down to a smaller, usable size. In order to reduce the size of the initially produced large web, the roll of a large web may be rewound onto a plurality of axially aligned cores of a predetermined length. As the web is wound from the large roll onto the cores, the web is split lengthwise to form a plurality of smaller webs having a predetermined width. This predetermined width corresponds to the width of the uptake cores, which are of a size desired by the end user. Prevention of overlap of the smaller webs between adjacent rolls on the rewinding device is critical, and therefore the slit web material is typically spread out, fanlike, by means of a spreader roll prior to rewind on the uptake cores. It is to be noted that a spreader roll is also useful, other than rewinding, to spread the web at numerous critical processes positions on web machines are related finishing and converting equipment.

A typical spreader roll is characterized by an arrangement of closely spaced and longitudinally arranged cylinder elements or segments rotatably supported on a stationary, bowed cylindrical shaft. The cylinder elements are typically held together, end-to-end, by a coupling and cleat combination to thereby present a substantially continuous cylindrical roll surface. Additionally, the cylindrical roll surface may be covered with a rubber composition.

The design of this type spreader roll has the disadvantage of producing a juncture or gap between the upper surfaces of adjacent cylinder elements. The gap at the juncture between adjacent cylinder edges is caused by the bow of the underlying shaft, which causes the upper surfaces of adjacent cylinder elements to be somewhat farther apart than the lower edges. This effect is caused by the incremental compensation of the total arc of the bow at every cylinder element juncture. The gaps created at the juncture between cylinder element edges create several disadvantages. For example, if use of a lightweight web material is desired, the web is prone to unwanted snagging on this gap between cylinder edges. This snagging is due to lack of web support at this linear junction, and is most notable during use of lightweight web material. Further, the linear gap between cylinder element edges often causes undesirable marking on the lightweight web surfaces contacting the spreader roll. Treatment of lightweight web material is particularly crucial in the paper industry, in which less expensive, lightweight paper stock is highly desired in the production of catalogues and mass-mailing pieces.

The present invention has as its objective to provide an improvement in the design of bowed spreader rolls, specifically the cylinder elements, and thereby ameliorate the above stated problems.

This objective is accomplished by the present invention of a spreader roll having cylinder rolls with novel mating end profiles.

SUMMARY OF THE INVENTION

The improved spreader roll of the present invention embodies an arrangement of closely spaced cylinder elements or segments, axially aligned, circumjacent to a stationary, bowed shaft. The longitudinally arranged cylinder elements are held together end-to-end by press fit couplings and interconnecting cleats, thereby presenting a substantially continuous cylindrical roll surface which is rotated about the stationary shaft. The longitudinally arranged cylinder elements are interconnected to each other in a row parallel to the shaft and are mounted on the bowed shaft through their respective bores using rolling bearings so that the outer bearing race rotates with respective cylinder elements, while each inner race is in stationary contact with the shaft. The opposite ends of the row of interconnected cylinder elements are adapted to be anchored to annular carriages, which may be driven to rotate the connected row around the shaft.

The cylinder elements each further include an outer surface for supporting web material, and oppositely disposed end portions, wherein at least one of the end portions is arranged for mating to an adjacent cylinder element end portion. The end portions include a nonlinear, preferably tessellated, peripheral edge portion arranged to intermesh with adjacent nonlinear end portions. The edge portion may be of any nonlinear configuration, however a generally defined sine wave is presently believed to be preferable. Other nonlinear edge configurations include tessellating square tooth, scallop, or saw tooth, by way of example.

It is to be understood that the term "web" may be defined as any flexible material such as paper or plastic that is carried on rolls during processing.

DESCRIPTION OF THE DRAWINGS

FIG. 7b is an enlarged view of the tabbed pattern seen in FIGS. 7 and 7a.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
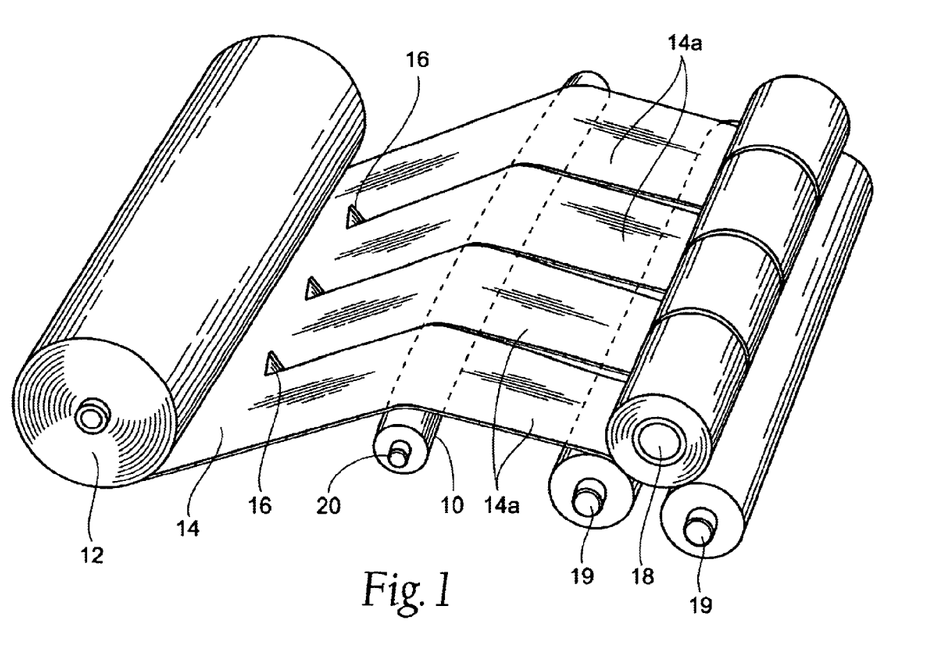
FIG. 1 is a diagrammatic view of a rewinding device including the novel spreader roll of the present invention.

A spreader roll 10 according to the present invention may be used to spread web material 14 at numerous critical processes positions on web handling machines and related finishing and converting equipment (not shown). As seen generally in FIG. 1, a spreader roll 10 is viewed in a rewinding configuration. A large roll 12 of web material 14 is slit by knives 16 to form a plurality of webs 14a having a width less than the width of the original web material 14. In the diagrammatic view shown in FIG. 1, the original web material 14 is split into four smaller webs 14a having widths determined by the position of the knives 16. The smaller webs 14a are rewound onto a plurality of cores 18 which are axially aligned in the nip formed between rewind rollers 19. The webs 14a are passed over the spreader roll 10 to thereby spread the webs 14a prior to rewinding on respective cores 18 and minimize the amount of overlap between the webs 14a.

A spreader roll 10 of the present invention, seen particularly in FIGS. 3–7b, comprises a bowed or bowable, nonrotating shaft 20 carried on supports 21, and a cylindrical outer surface 22 comprising a plurality of cylinder elements 24 which are mutually interconnected along nonlinear end profiles 30. As may be seen in FIG. 5, the cylinder elements 24 each include a bore 26, a cylindrical outer surface 28, and oppositely disposed ends 30a, 30b. The ends 30a, 30b further define a novel, nonlinear end profile 30. The cylinder elements 24 are axially aligned along the shaft 20 with the shaft 20 passing through the respective bore 26 of each cylinder element 24.

Figure 5:
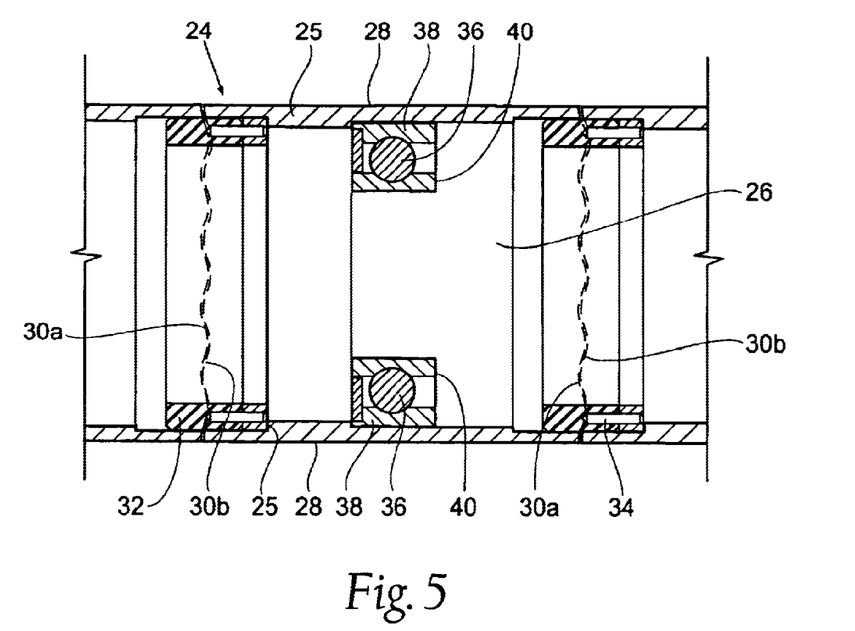
FIG. 5 is a fragmentary, longitudinal sectional view of the spreader roll of FIG. 3 and taken along line 5—5 thereof.

As seen particularly in FIG. 5, the spreader roll 10 shown in the Figures includes coupling elements 32 and mating, pin-like cleats 34 between adjacent cylinder elements 24. The coupling 32 and cleat 34 combination is used to lock adjacent ends 30a, 30b of cylinder elements 24 together to form the cylindrical outer surface 22 of the spreader roll 10 seen in FIG. 3. The coupling elements 32 and pin-like cleats 34 are press fit into a respective bore 26 of each cylinder element 24 against an undercut shoulder 25 for secure fit. The coupling elements 32 and pin-like cleats 34 serve to keep the opposite ends 30a, 30b of each adjacent cylinder element 24 mated to each other in a row, yet allow axial inclination of the adjacent cylinder elements 24 relative each other and transmission of rotating torque from one element 24 to the next adjacent one. The coupling elements 32 are preferably formed from a flexible material, such as rubber, while the pin-like cleats 34 are preferably in the form of steel dowel pins. It is to be noted, with reference to FIG. 6 that opposite ends of the row of interconnected cylinder elements 24 include an end cylinder 24a, having a modified end portion 30c. Modified ends 30c are each adapted to receive an end cap 35, which is provided to protect the inner mechanical parts against dirt and damage. At least one end cap 35 may be made with a groove 37 to permit driving the interconnected cylinder 24 row by a belt (not shown), if desired.

Figure 6:
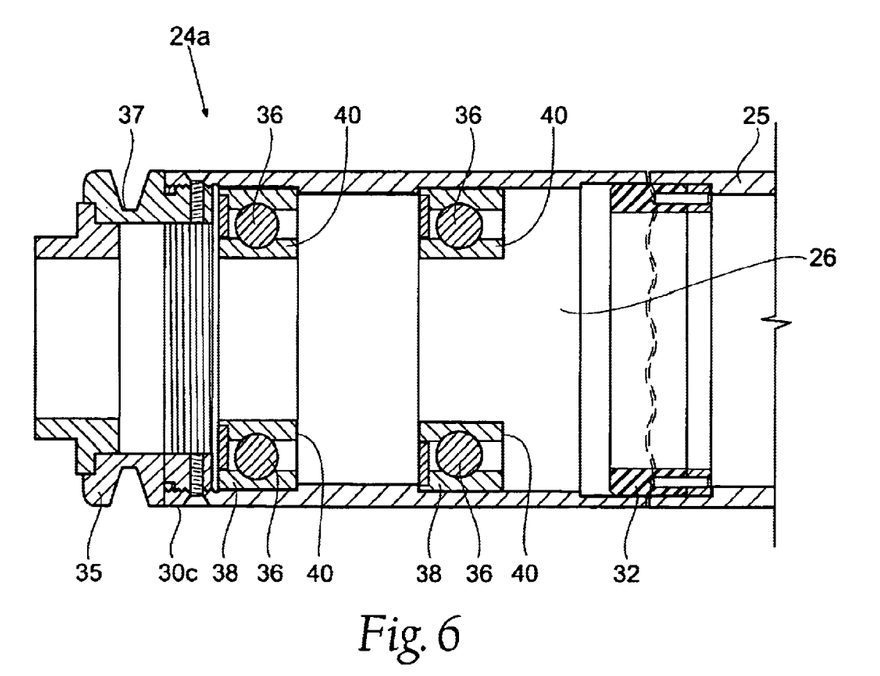
FIG. 6 is a fragmentary, longitudinal sectional view of the spreader roll of FIG. 3 and taken along line 6—6 thereof.

As illustrated in the views of FIGS. 5 and 6, each cylinder element 24 is mounted for rotation on the shaft 20 by means of suitable bearings 36. The bearings 36 may comprise any conventional bearing, preferably a roller bearing, such as the ball bearing 36 seen in these views. Each cylinder element 24 is mounted on the shaft 20 so that the outer race 38 of the bearing 36 rotates with the cylinder element 24 and the inner race 40 is supported on the shaft 20, thus remaining stationary. This arrangement facilitates the rotation of the cylinder elements 24 around the shaft 20.

Figure 2:
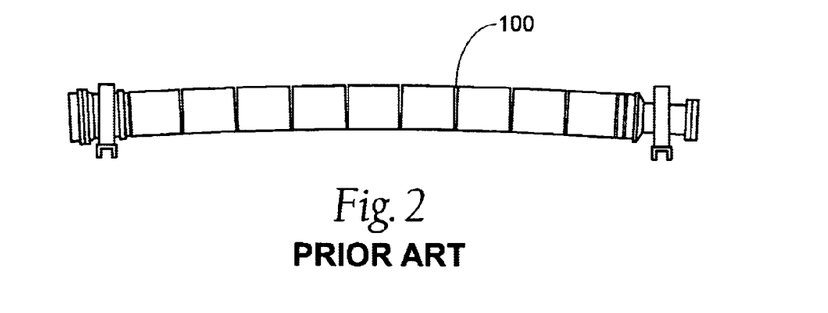
FIG. 2 is a side elevational view of a prior art spreader roll and showing the linear gaps between the cylinder elements.
Figure 3:
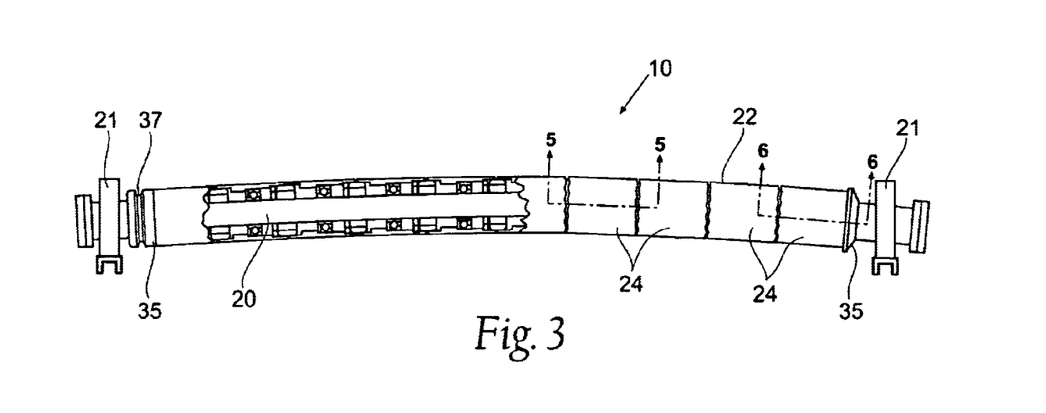
FIG. 3 is a side elevational view of a spreader roll of the present invention showing a wave-patterned juncture between adjacent cylinder roll ends and a partially cut away portion.
Figure 4:
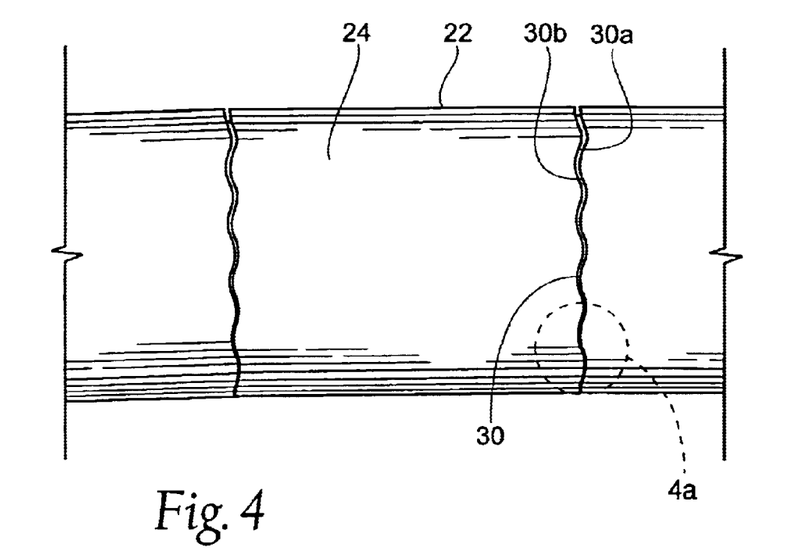
FIG. 4 is a fragmentary enlarged view of the wave-patterned juncture shown in FIG. 3.
Figure 4A:
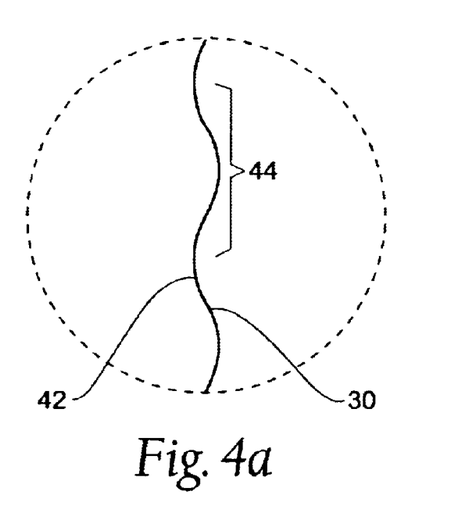
FIG. 4a is an enlarged view of the wave pattern seen in FIGS. 3 and 4.

As illustrated in the views of FIGS. 4 and 4a, the ends 30a, 30b of adjacent cylinder elements 24 preferably include a nonlinear profile 30, seen as a generally defined sine wave pattern, in these views. The novel ends 30a and 30b defining the nonlinear end profile 30 of the present invention, provide intermittent support of the web 14a as it passes over the outer surface 22 of the spreader roll 10, and thereby provide greater support than the conventional linear profile seen in the prior art drawing of FIG. 2. As stated above, the conventional linear profile of FIG. 2, indicated generally by reference numeral 100, typically causes abnormal fanning of a lightweight web 14a as it passes over the spreader roll 10. For instance, lightweight web 14a is often snagged or marked by the linear gap 100 due to nonsupport of the web 14a at the linear juncture. The nonlinear feature of the present invention is advantageous as it provides intermittent support for the web 14a, thereby reducing the snagging and marking of lightweight web 14a material caused by conventional linear profiles.

Figure 4B:
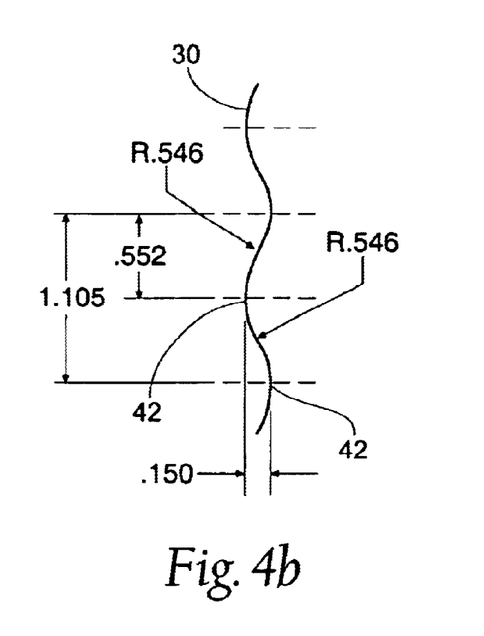
FIG. 4b is a view of wave patterns similar to FIG. 4a and including the dimensions of the preferred embodiment.

As seen particularly in the views of FIGS. 4–4b, one embodiment of the novel wave pattern is comprised of a sine wave. Although any sine wave pattern may be used to produce the desired result, it is presently believed preferable that the wave profile have the dimensions set forth in the view of FIG. 4b, i.e.: the crest 42-to-crest 42 length being 1.105 inches; one half wave length being 0.552 inches; and the mating radii of each wave 44 being 0.546 inches. The wave 44 height is preferably 0.150 inches. It will be apparent that while these dimensions are preferred, they may be varied to conform to a proportionally selected size of cylinder element 24.

Figure 7:
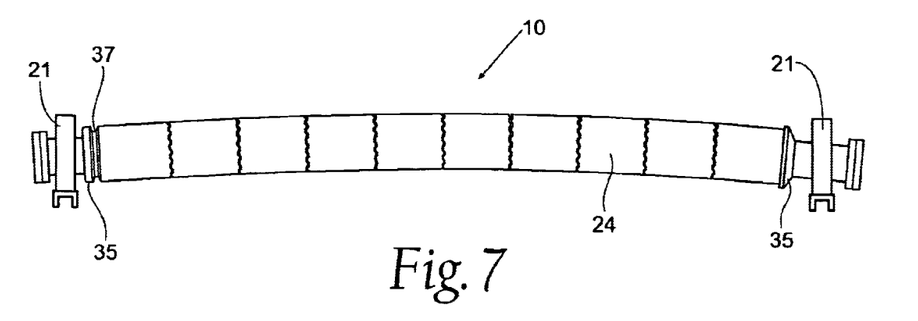
FIG. 7 is a side elevational view of an alternative embodiment spreader roll and showing an alternative tabbed, or tessellated, partially mosaic juncture between adjacent cylinder roll ends.
Figure 7A:
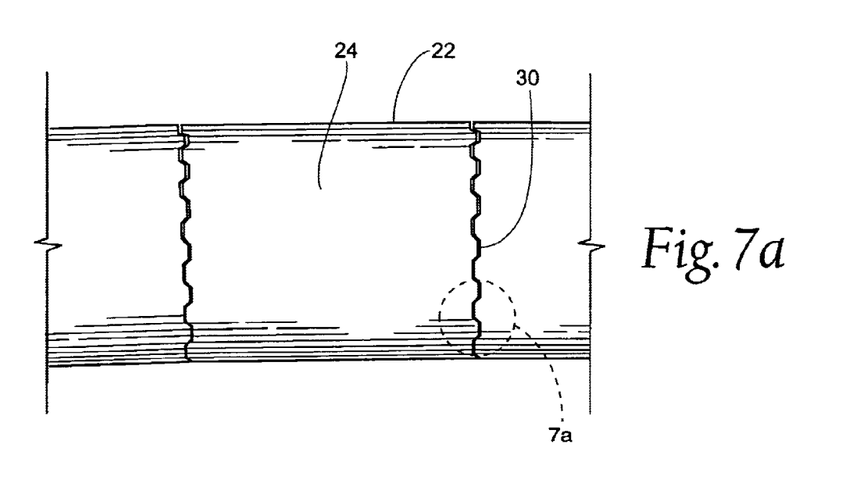
FIG. 7a is a fragmentary enlarged view of the tabbed pattern juncture shown in FIG. 7.
Figure 7B:
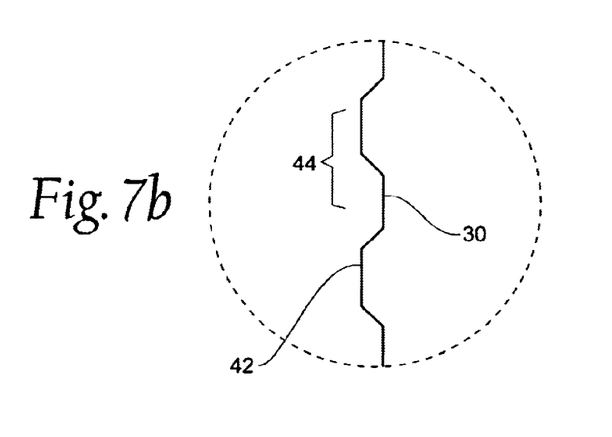

An alternative embodiment nonlinear profile 30 may be seen in the view of FIGS. 7–7b. In these views the pattern is modified to a tabbed configuration wherein the crests 42 of each wave 44 are somewhat flattened to achieve a tessellated, partially mosaic pattern. It is to be understood that while the nonlinear end profile 30 is a generally defined wave pattern, other nonlinear patterns may be used to provide the necessary intermittent support of web passing over the spreader roll 10. It is also conceivable that other patterns may be used such as saw tooth or scallop patterns, by way of example.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A spreader roll for web processing machines of the type used in the paper, textile and plastics industry, for use on a web of material to be splayed, the spreader roll comprising:
   a shaft, said shaft being bowed along a longitudinal axis;
   a bowed cylindrical outer surface comprising a plurality of cylindrical elements axially aligned along said shaft, each of said elements having an outer surface and at least one end portion having a nonlinear profile; and whereby the splayed web is intermittently supported by at least one of said plurality of cylindrical elements at said nonlinear profile.

2. The spreader roll of claim 1 wherein said non-linear profile of adjacent ones of said cylinder elements are arranged in mating relationship.

3. The spreader roll of claim 2 wherein said non-linear profile defines a generally sine wave configuration.

4. The spreader roll of claim 3 wherein said sine wave configuration includes flattened areas.

5. The spreader roll of claim 3 wherein said sine wave configuration includes tessellated, partially mosaic flattened areas.

6. A spreader roll for web processing machines of the typed used in the paper, textile and plastics industry for use on a web of material to be splayed, the spreader roll comprising a shaft, said shaft being bowed along a longitudinal axis;

a plurality of roll segments, said roll segments being bowed and rotatably supported on said shaft;

each said segment having at least one non-linear end edge profile; and whereby the splayed web is intermittently supported by at least one of said plurality of cylindrical elements at said nonlinear profile.

7. The spreader roll of claim 6 wherein said non-linear end edge profiles are arranged to intermesh with adjacent roll segments.

8. The spreader roll of claim 6 wherein said non-linear end edge profile is substantially sinusoidal.

9. The spreader roll of claim 8 wherein the substantially sinusoidal edge profile includes at least one flattened area.

10. The spreader roll of claim 8 wherein the substantially sinusoidal edge profile includes tessellated, partially mosaic flattened areas.

11. A spreader roll for web processing machines of the typed used in the paper, textile and plastics industry for use on a web of material to be splayed, the spreader roll comprising a shaft, said shaft being bowed along a longitudinal axis;

a bowed cylindrical outer surface comprising a plurality of cylindrical roll segments axially aligned and rotatably supported on said shaft;

each said segment having a sinusoidal end edge profile; and whereby the splayed web is intermittently supported by at least one of said plurality of cylindrical elements at said nonlinear profile.

12. The spreader roll of claim 11 wherein said non-linear end edge profiles are arranged to interlock with adjacent roll segments.

13. The spreader roll of claim 11 wherein each said sinusoidal end edge profile includes at least one flattened area.

14. The spreader roll of claim 11 wherein each said sinusoidal end edge profile includes tessellated, partially mosaic flattened areas.

* * * * *

UNITED STATES PATENT AND TRADEMARK OFFICE
CERTIFICATE OF CORRECTION

PATENT NO. : 6,843,762 B2
DATED : January 18, 2005
INVENTOR(S) : Denis L. Munsche and David P. Boutin It is certified that error appears in the above-identified patent and that said Letters Patent is hereby corrected as shown below:

Title page,
Item [75], Inventors, delete "Munche" and substitute -- Munsche --.
Item [57], ABSTRACT,
Line 3, delete "processes" and substitute -- process --.

Column 5,
Line 15, delete "typed" and substitute -- type --.

Column 6,
Line 7, delete "typed" and substitute -- type --.

Signed and Sealed this

Thirtieth Day of August, 2005

JON W. DUDAS
*Director of the United States Patent and Trademark Office*